(12) United States Patent
Ukai

(10) Patent No.: US 7,447,881 B2
(45) Date of Patent: Nov. 4, 2008

(54) BRANCH PREDICTION APPARATUS AND METHOD

(75) Inventor: Masaki Ukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 238 days.

(21) Appl. No.: 10/338,663

(22) Filed: Jan. 9, 2003

(65) Prior Publication Data

US 2004/0003216 A1     Jan. 1, 2004

(30) Foreign Application Priority Data

Jun. 28, 2002    (JP)   ................................ 2002-191276

(51) Int. Cl.
*G06F 9/00*      (2006.01)
(52) U.S. Cl. ..................... 712/237; 712/238; 712/239
(58) Field of Classification Search ................ 712/238, 712/239, 237
See application file for complete search history.

(56) References Cited

U.S. PATENT DOCUMENTS

| | | | | |
|---|---|---|---|---|
| 5,142,634 | A * | 8/1992 | Fite et al. ..................... | 712/240 |
| 5,606,676 | A * | 2/1997 | Grochowski et al. .......... | 712/23 |
| 5,835,754 | A * | 11/1998 | Nakanishi ..................... | 712/239 |
| 5,878,254 | A * | 3/1999 | Shimada et al. .............. | 712/238 |
| 5,918,045 | A * | 6/1999 | Nishii et al. .................. | 712/237 |
| 5,944,817 | A * | 8/1999 | Hoyt et al. ................... | 712/240 |
| 5,948,100 | A * | 9/1999 | Hsu et al. ..................... | 712/238 |
| 6,247,124 | B1 * | 6/2001 | Joshi et al. ................... | 712/240 |
| 6,647,490 | B2 * | 11/2003 | Keller et al. ................. | 712/233 |
| 6,851,043 | B1 | 2/2005 | Inoue | |
| 7,024,545 | B1 | 4/2006 | Zuraski, Jr. et al. | |

FOREIGN PATENT DOCUMENTS

| | | |
|---|---|---|
| JP | H1-142941 | 6/1989 |
| JP | HEI 1-142941 A | 6/1989 |
| JP | HEI 06-089173 A | 3/1994 |
| JP | HEI7-210383 | 8/1995 |
| JP | 2000-132392 A | 5/2000 |
| JP | 2000-172507 A | 6/2000 |
| JP | 2005-500616 | 1/2005 |
| WO | WO 03/017091 | 2/2003 |

OTHER PUBLICATIONS

U.S. Appl. No. 09/456,523, filed Dec. 8, 1999, Ukai et al., Fujitsu Limited.
Japanese Office Action mailed Jan. 24, 2006 in Japanese Patent Application No. 2002-191276 corresponding the present above-identified pending US patent application (3 pages), including partial English translation thereof (5 pages).

* cited by examiner

*Primary Examiner*—Eddie P Chan
*Assistant Examiner*—Jacob Petranek
(74) *Attorney, Agent, or Firm*—Staas & Halsey LLP

(57) ABSTRACT

A branch prediction apparatus has a configuration such that a predicted branch target address and an offset are obtained by referring to a branch history, an instruction fetch address and the offset are added to obtain a branch instruction address, the branch instruction address is subtracted from the predicted branch target address to obtain a predicted displacement, and this predicted displacement is compared with a displacement cut-out from an instruction by an instruction decoder, to judge whether the predicted branch target address is correct or not.

18 Claims, 5 Drawing Sheets

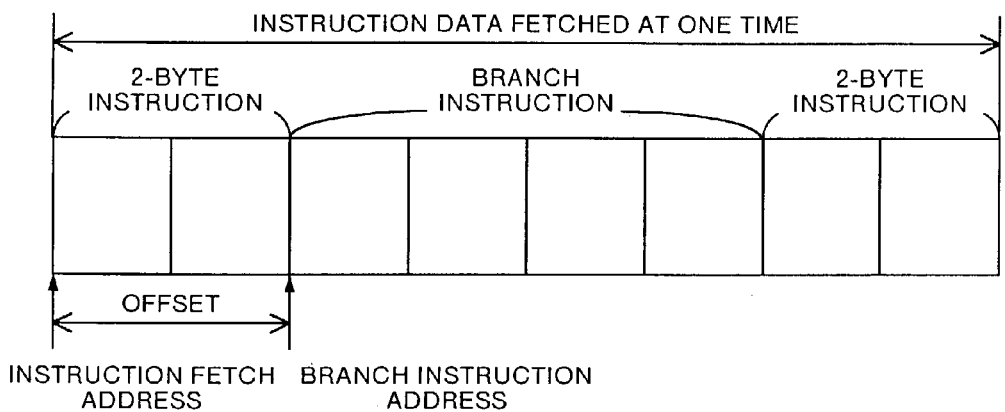
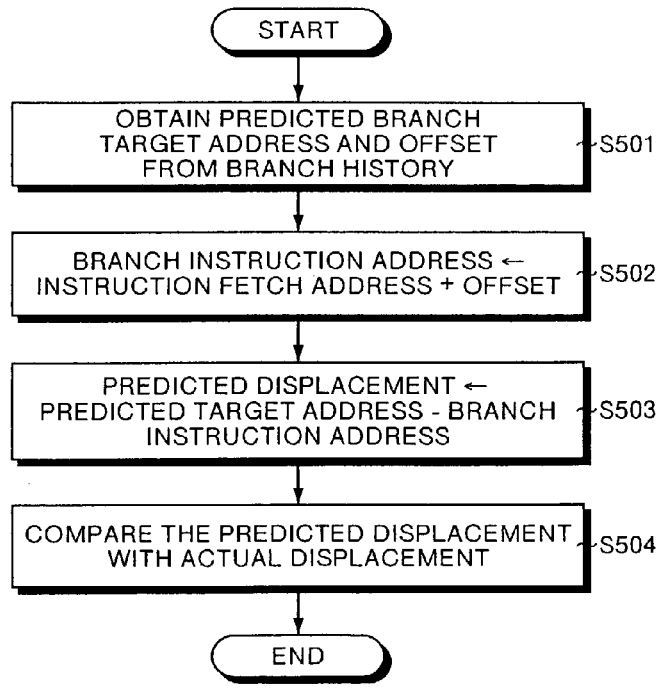

BRANCH PREDICTION APPARATUS AND METHOD

BACKGROUND OF THE INVENTION

1) Field of the Invention

The present invention relates to a technology for predicting a branch target address of a branch instruction and making a judgment whether the predicted branch target address agrees with an actual branch target address at a high speed.

2) Description of the Related Art

In an information processing apparatus that adopts a high degree instruction processing method following the pipeline processing method, performance is improved by starting the processing for the subsequent instruction speculatively, without waiting for the execution of one instruction.

When a branch instruction is to be executed, however, an instruction address to be executed next cannot be known unless one instruction has been executed, and hence the processing for the subsequent instruction cannot be started. Therefore, attention has been given to a technique in which by predicting an instruction address to be executed next, the processing for the subsequent instruction can be started before executing a branch instruction.

For example, Japanese Patent Application Laid-Open No. H6-89173 discloses a technique of predicting an instruction address to be executed next using a branch history. In this conventional art, a branch instruction address executed in the past and a branch target address thereof are registered in the branch history, corresponding to each other. When a branch instruction registered in the branch history is to be executed newly, an instruction address to be executed next is predicted using the branch target address corresponding to the branch instruction.

Japanese Patent Application Laid-Open No. 2000-172507 discloses a technique of increasing a prediction accuracy of a branch target address of a subroutine return instruction. In the subroutine return instruction, the branch target address changes, and therefore the branch target address in the past registered in the branch history is often different from an actual branch target address, and hence the prediction is quite possible to fail. Therefore, in this conventional art, when a return address in a return address stack that stores subroutine return addresses, agrees with a branch target address in the branch history, the address is designated as a predicted address of the subsequent instruction, thereby improving the prediction accuracy.

However, when the processing for the subsequent instruction is to be performed speculatively using such a branch prediction technique, it is necessary to cancel the executed processing for the subsequent instruction if the prediction is failed. Therefore, at a point of time when the actual branch target address is calculated, it is necessary to judge whether the actual branch target address agrees with the predicted branch target address by comparing these addresses. It is also necessary that this judgment is carried out on the same pipeline stage as that for the calculation of the actual branch target address, so that the processing performance is not deteriorated.

However, as the clock cycle has become fast recently, it becomes difficult to carry out the calculation of the actual branch target address, and comparison between the calculated actual branch target address and the predicted branch target address in one cycle of the pipeline. As a result, the processing performance deteriorates. Therefore, it becomes necessary to carry out the calculation of the actual branch target address, and comparison between the calculated actual branch target address and the predicted branch target address in different cycle of the pipeline.

SUMMARY OF THE INVENTION

It is an object of the present invention to provide a branch prediction apparatus and method capable of judging, at a high speed, whether a predicted branch target address is correct or not and preventing performance deterioration due to the judgment.

The branch prediction apparatus, according to one aspect of this invention, predicts a branch target address of a branch instruction, and makes a judgment whether a predicted branch target address agrees with an actual branch target address. The branch prediction apparatus comprises a predicted relative address generation unit that generates a predicted relative address from the predicted branch target address and a reference address, and a prediction judgment unit that makes the judgment by comparing the generated predicted relative address with an actual relative address of the branch instruction.

The branch prediction method according to another aspect of this invention comprises predicting a target address of a branch instruction, and making a judgment whether a predicted branch target address agrees with an actual branch target address. The branch prediction method comprises steps of generating a predicted relative address from the predicted branch target address and a reference address, and making the judgment by comparing the generated predicted relative address with the actual relative address of the branch instruction.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 3 is a diagram showing one example of data structure of an entry in branch history, FIG. 4 is a diagram showing one example of offset, FIG. 5 is a flowchart showing the processing procedure of the judgment whether a predicted branch target address is correct or not performed by the branch prediction apparatus according to the first embodiment.

DETAILED DESCRIPTIONS

Embodiments of the branch prediction apparatus and method according to the present invention will be explained in detail with reference to the accompanying drawings. In a first embodiment, an example in which this invention is applied to an information processing apparatus that performs basic pipeline processing, will be explained. In a second embodiment, an example in which this invention is applied to an information processing apparatus that employs out-of-order control, will be explained.

Figure 1A:
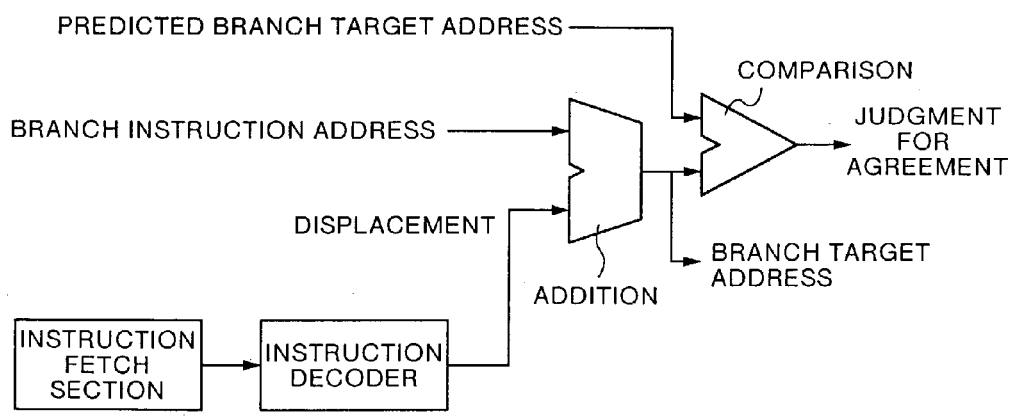
FIG. 1A and FIG. 1B are diagrams for explaining the principle of judgment whether a predicted branch target address is correct or not according to a first embodiment of this invention.
Figure 1B:
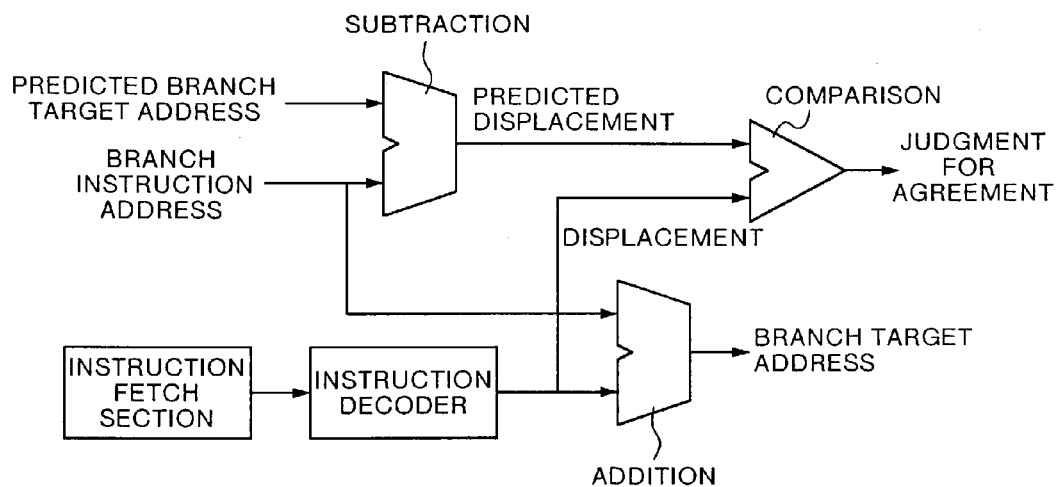

The first embodiment will be explained below. The principle of judgment whether a predicted branch target address is correct or not according to the first embodiment, that is, the principle of judgment whether the predicted branch target address agrees with an actual branch target address will be explained. FIG. 1A and FIG. 1B are diagrams for explaining the principle of the judgment according to the first embodiment.

As shown in FIG. 1A, in the conventional judgment whether a predicted branch target address is correct or not, an instruction decoder decodes a branch instruction fetched by an instruction fetch section, and cuts out a displacement included in the instruction. Here, the displacement stands for a relative address obtained by subtracting a branch instruction address from a branch target address, and in the branch instruction, the branch target address is often specified by the displacement.

The branch instruction address is added to the cut-out displacement to calculate an actual branch target address, and the calculated actual branch target address is compared with the predicted branch target address to judge whether the predicted branch target address is correct or not. Therefore, two operations that are addition and comparison, are required for the processing from cutting out of the displacement by the instruction decoder to the judgment whether the predicted branch target address is correct or not.

On the other hand, as shown in FIG. 1B, in the judgment whether the predicted branch target address is correct or not according to the first embodiment, the branch instruction address is subtracted from the predicted branch target address in parallel with the processing by the instruction decoder, to thereby obtain a predicted displacement that is a displacement with respect to the predicted branch target address.

The judgment whether the predicted branch target address is correct or not is performed by comparing the predicted displacement with the displacement cut-out by the instruction decoder. Therefore, only the comparison operation is required for the processing from cutting out of the displacement by the instruction decoder to the judgment, and the additive operation is not necessary.

As described above, in the first embodiment, instead of making a judgment whether the predicted branch target address is correct or not by comparing the actual branch target address with the predicted branch target address, a predicted displacement is obtained in parallel with the processing by the instruction decoder, and this predicted displacement is compared with the displacement cut-out by the instruction decoder to thereby make a judgment whether the predicted branch target address is correct or not. Therefore, after instruction is decoded by the instruction decoder, the judgment whether the predicted branch target address is correct or not can be made only by the processing by a comparator, thereby judgment can be made at a higher speed.

Figure 2:
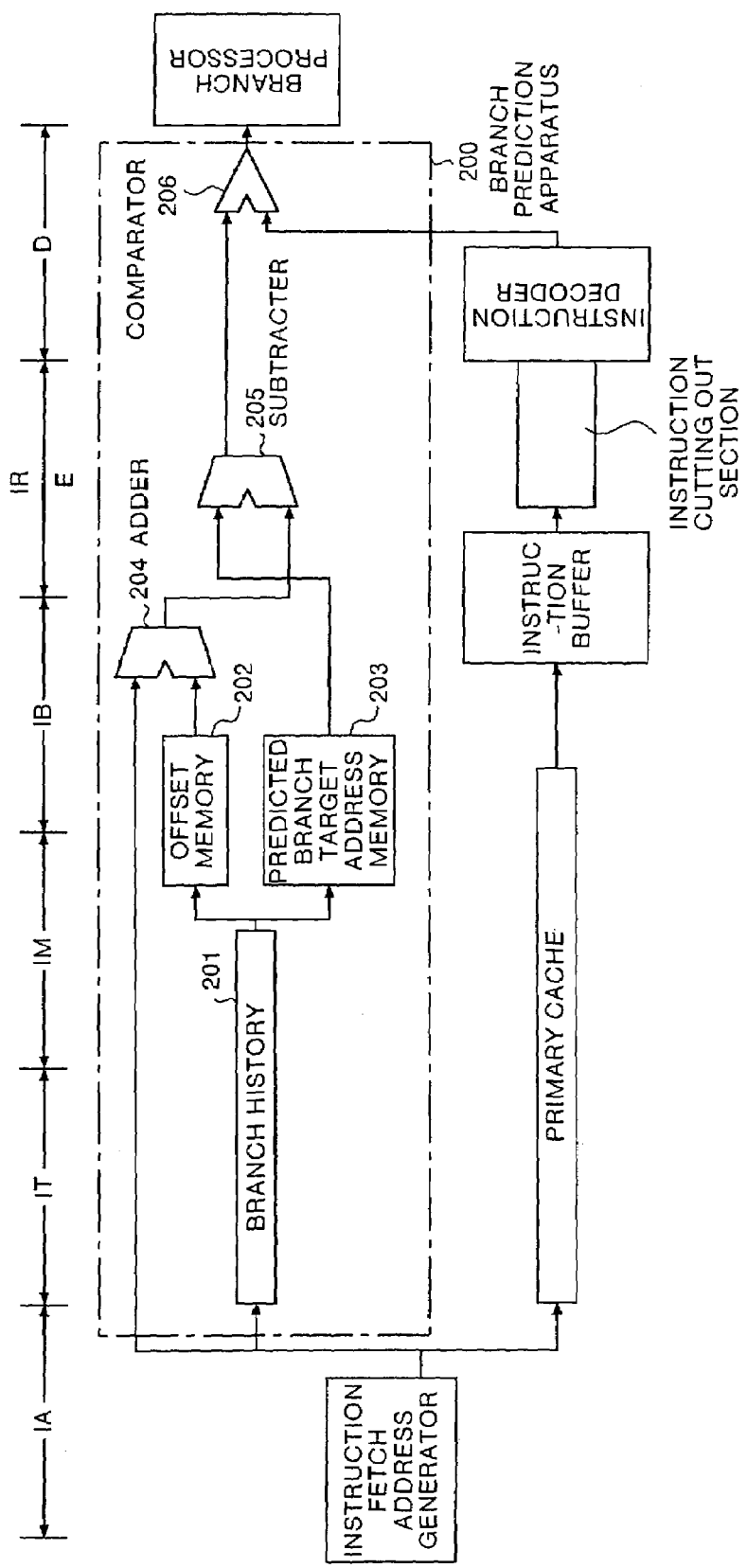
FIG. 2 is a functional block diagram showing the configuration of a branch prediction apparatus according to the first embodiment.

The configuration of the branch prediction apparatus according to the first embodiment will be explained below. FIG. 2 is a functional block diagram showing the configuration of the branch prediction apparatus according to the first embodiment. As shown in this figure, a branch prediction apparatus 200 comprises a branch history 201, an offset memory 202, a predicted branch target address memory 203, an adder 204, a subtracter 205 and a comparator 206.

The branch history 201 is a memory that stores branch target addresses of branch instructions executed in the past. When a branch instruction is included in the instruction data fetched from a primary cache, this branch history 201 is used for predicting a branch target address of the branch instruction.

FIG. 3 is a diagram showing one example of data structure of an entry in the branch history 201. As shown in this figure, the entry in the branch history 201 includes control information, a branch instruction address, and a predicted branch target address.

The control information is such that information about whether a branch has been established when this branch instruction has been executed in the past is controlled. The branch instruction address is an instruction address of the branch instruction and is used as a reference for the branch history 201. The predicted branch target address is a branch target address used when this branch instruction has been executed in the past, and when this branch instruction is to be executed next, this address is used as a predictor of the branch target address.

The offset memory 202 is a memory that temporarily stores an offset obtained by subtracting an instruction fetch address from the branch instruction address. FIG. 4 is a diagram showing one example of the offset. In this figure, a length of the instruction data fetched at one time is 8 bytes, and three instructions, a 2-byte instruction, a 4-byte branch instruction, and a 2-byte instruction are included in this instruction data in order. In this example, the branch instruction address is the instruction fetch address +2, and hence the offset becomes 2.

This offset is set in the offset memory 202 by referring to the branch history 201 by the instruction fetch address. In other words, the branch history 201 is referred to by all instruction addresses other than by the instruction fetch address if all instructions included in the instruction data to be fetched have a minimum instruction length. When a branch instruction address that agrees with either one of these addresses is registered in the branch history 201, a difference between the branch instruction address and the instruction fetch address is designated as an offset to be set in the offset memory 202.

For example, when the length of the instruction data fetched at one time is 8 bytes and the minimum instruction length is 2 bytes, and if the instructions included in the fetched data are all 2-byte instructions, the branch history 201 is referred to by four addresses, that is, an instruction fetch address, the instruction fetch address +2, the instruction fetch address +4, and the instruction fetch address +6. If the instruction at the address of instruction fetch address +2 is a branch instruction, 2 is set in the offset memory 202.

The predicted branch target address memory 203 stores predicted branch target addresses of branch instructions, and the predicted branch target address can be obtained together with the offset, by referring to the branch history 201.

The adder 204 is a processor that adds two input values to thereby output the addition result. Here, the adder 204 is used for adding the instruction fetch address and the offset to the two values to calculate the branch instruction address.

The subtracter 205 is a processor that carries out subtraction between two input values, and outputs the result. Here, it is used for subtracting the branch instruction address from the predicted branch target address to calculate a predicted displacement.

The comparator 206 is a processor that compares the two input values, and outputs whether these values agree with each other. Here, it is used for judging whether the predicted branch target address agrees with an actual branch target address by comparing the predicted displacement output by the subtracter 205 with a displacement cut-out from the instruction by the instruction decoder.

In this manner, the comparator 206 judges whether the actual branch target address and the predicted branch target address agree with each other, by using the displacement and the predicted displacement. Therefore, it is not necessary to calculate the actual branch target address after cutting out of the displacement, and hence the judgment whether the predicted branch target address is correct or not can be made at a higher speed.

In FIG. 2, reference signs IA, IT, IM, IB, IR, E and D are stage names in the pipeline, and the IA (Instruction Address) indicates a stage where the instruction fetch address is generated, the IT (Tag Read) indicates a stage where a cache tag is readout, and the IM (Tag Match) indicates a stage where the cache tag is matched with the instruction fetch address.

The IB (Buffer Read) indicates a stage where instruction data in a cache whose tag matches with the instruction fetch address, is read out, and the IR (Result) indicates a stage where the instruction data is set in the instruction buffer. Similarly, the E (Pre-Decode) indicates a stage where one instruction is cut out from the instruction buffer, and the D (Decode) indicates a stage where the cut-out instruction is decoded.

Therefore, FIG. 2 shows any stage of the pipeline on which each functional section operates as well as the functional configuration of the branch prediction apparatus 200. Specifically, FIG. 2 shows that the branch history 201 is referred to on the IT stage and the IM stage, and that an offset and a predicted branch target address can be obtained from the IM stage to the IB stage. In the latter half of the IB stage, the adder 204 operates to obtain a branch instruction address.

FIG. 2 also shows that on the IR stage, the subtracter 205 operates to obtain a predicted displacement, and on the D stage, the comparator 206 operates to perform a judgment whether the predicted branch target address agrees with the actual branch target address.

Further, FIG. 2 shows any stages of the pipeline on which the instruction fetch address generator that operates to decode an instruction, the primary cache, the instruction buffer, an instruction cutting out section, and the instruction decoder operate, respectively. Particularly, it is shown that on the D stage, decoding of an instruction and judgment whether the predicted branch target address is correct or not are carried out on one-cycle stage. It is noted that this figure shows an example when the IR stage and the E stage are the same cycle stage, but these stages may be a different cycle stage.

Processing procedure of the judgment whether the predicted branch target is correct or not made by the branch prediction apparatus 200 according to the first embodiment will be explained below. FIG. 5 is a flowchart showing the processing procedure of the judgment made by the branch prediction apparatus 200 according to the first embodiment.

As shown in FIG. 5, the branch prediction apparatus 200 refers to the branch history 201, using the instruction fetch address generated by the instruction fetch address generator, and obtains an offset and a predicted branch target address (step S501).

The adder 204 adds the obtained offset and instruction fetch address to obtain a branch instruction address (step S502), and the subtracter 205 subtracts the branch instruction address from the predicted branch target address to thereby obtain a predicted displacement (step S503).

The comparator 206 compares the predicted displacement with the actual displacement, to thereby judge whether the predicted branch target address agrees with the actual branch target address (step S504).

As described above, in the first embodiment, by referring to the branch history 201, an offset together with a predicted branch target address is obtained, and the instruction fetch address and the offset are added to obtain the branch instruction address. The branch instruction address is subtracted from the predicted branch target address to obtain a predicted displacement, and this predicted displacement is compared with the displacement cut-out from the instruction by the instruction decoder. Thereby, the judgment whether the predicted branch target address is correct or not is carried out. As a result, it is not necessary to calculate the actual branch target address in order to carry out the judgment, and hence the decoding of the branch instruction and the judgment of the branch target address can be carried out at a high speed on one cycle stage in the pipeline.

In the first embodiment, the predicted branch target address is registered in the branch history 201, but the predicted displacement may be registered instead of the predicted branch target address. Further, both of the predicted branch target address and the predicted displacement may be registered in the branch history 201.

Further, in the first embodiment, the offset is obtained by referring to the branch history 201, but the offset can be obtained by pre-decoding the branch instruction in the instruction buffer.

A second embodiment of this invention will be explained below. The first embodiment is provided to show an example in which the present invention is applied to a basic pipeline processing. However, the recent information processing apparatus adopts the out-of-order control in which the execution order of instructions is changed to carry out processing based on an executable instruction. Therefore, in the second embodiment, an example in which the present invention is applied to an information processing apparatus that performs the out-of-order control, will be explained.

Figure 6:
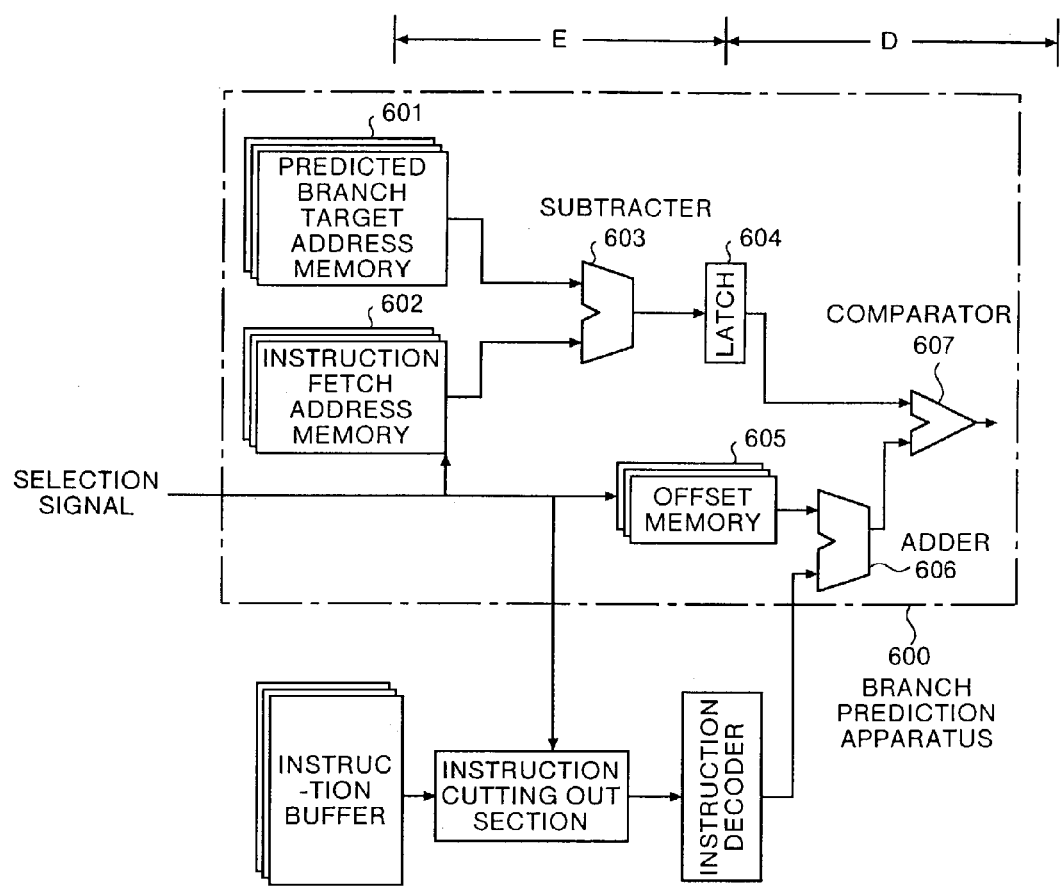
FIG. 6 is a functional block diagram showing the configuration of a branch prediction apparatus according to a second embodiment of this invention.

FIG. 6 is a functional block diagram showing the configuration of a branch prediction apparatus according to the second embodiment. In the out-or-order control, the order of performing the instruction fetch requests does not always agree with the order of setting the instruction data in the instruction buffer. For example, when instruction data for which the instruction fetch request has been received first is not in the primary cache, any other instruction data may be first set in the instruction buffer if the instruction data is in the primary cache even if this instruction data is one for which the instruction fetch request has been received later.

Therefore, the timing at which the instruction data is set in the instruction buffer is different depending on location of the storage of the instruction data at the time point of requesting the instruction fetch. FIG. 6 shows the functional sections of the branch prediction apparatus that operate on the stage in pipeline where the operation timing does not depend on the storage location of the instruction data. That is, FIG. 6 shows the functional sections operating on the E stage and the D stage downstream of the stage where the instruction data is set in the instruction buffer.

As shown in FIG. 6, a branch prediction apparatus 600 has a predicted branch target address memory 601, an instruction fetch address memory 602, a subtracter 603, a latch 604, an offset memory 605, an adder 606, and a comparator 607, as the functional sections that operate on the E stage and the D stage.

The predicted branch target address memory 601 stores predicted branch target addresses of branch instructions, as the prediction target address memory 203 shown in FIG. 2. The offset memory 605 is stores offsets, as the offset memory 202 shown in FIG. 2. In the out-of-order control, however, a plurality of instruction fetch requests are processed in parallel, and therefore the both memories can store plural pieces of data.

The instruction fetch address memory 602 stores instruction fetch addresses, and this instruction fetch address memory 602 also can store a plurality of instruction fetch addresses.

The subtracter 603 is a processor that carries out subtraction between two input values, and outputs the result. Here, this processor is used for calculating a predicted displacement by subtracting an instruction fetch address from a predicted branch target address and adding an offset to the value.

The latch 604 is a memory that temporarily latches data for synchronization. Here, the latch 604 is used for temporarily latching the predicted displacement added with the offset, before it is input to the comparator 607.

The adder 606 is a processor that adds two input values to thereby output the addition result. Here, the adder 606 is used for adding the offset to an actual displacement when the instruction decoder decodes a branch instruction and outputs the instruction.

The comparator 607 is a processor that compares the two input values and outputs information as to whether these two values agree with each other. Here, it is used for making a judgment whether the predicted branch target address agrees with the actual branch target address, by comparing the predicted displacement with the actual displacement based on values obtained by adding the offsets to the displacements, respectively.

The selection signal is a signal for selecting an instruction to be executed next from a plurality of instruction buffers. By this selection signal, the predicted branch target address, the offset, and the instruction fetch address of the branch instruction to be executed next are respectively selected, from the prediction target address memory 601, the offset memory 605, and the instruction fetch address memory 602.

This selection signal is generated based on the hour when a fetch of instruction data is requested to the memory such as the primary cache, a secondary cache, and a main memory, and the time required for writing the instruction data from the respective memories to the instruction buffer.

The offset value is very small as compared with the displacement, and hence the adder 606 can be formed only with an incrementer or the like. Therefore, the adder 606 can perform addition at an overwhelmingly high speed, as compared with a whole bit adder. In many reduced instruction set computer (RISC) type CPUs, decoding of instructions is very simple, and hence cutting out of a displacement portion from the instruction word can be performed at a high speed. Therefore, in the RISC type CPU, the processing up to the comparator 607 shown in FIG. 6 can be finished on the D stage.

As described above, in the second embodiment, the predicted branch target addresses, offsets, and instruction fetch addresses corresponding to a plurality of branch instructions are stored, and a predicted branch target address, an offset, and an instruction fetch address corresponding to a branch instruction to be processed next are respectively selected, using a selection signal, and it is judged whether the predicted branch target address agrees with the actual branch target address, by comparing the predicted displacement and the actual displacement based on the values obtained by adding the offsets to the displacements, respectively. As a result, even in the information processing apparatus that adopts the out-of-order control, the judgment whether the branch target address is correct or not can be finished on the D stage in the pipeline if it is the RISC type CPU.

On the other hand, in many complex instruction set computer (CISC) type CPUs, decoding of instructions is complicated, and hence cutting out of the displacement takes time. Therefore, in the configuration of the branch prediction apparatus 600 shown in FIG. 6, the processing up to the comparator 607 cannot be finished on the D stage. To solve the problem, the configuration of the branch prediction apparatus in the instance of the CISC type CPU will be explained below.

Figure 7:
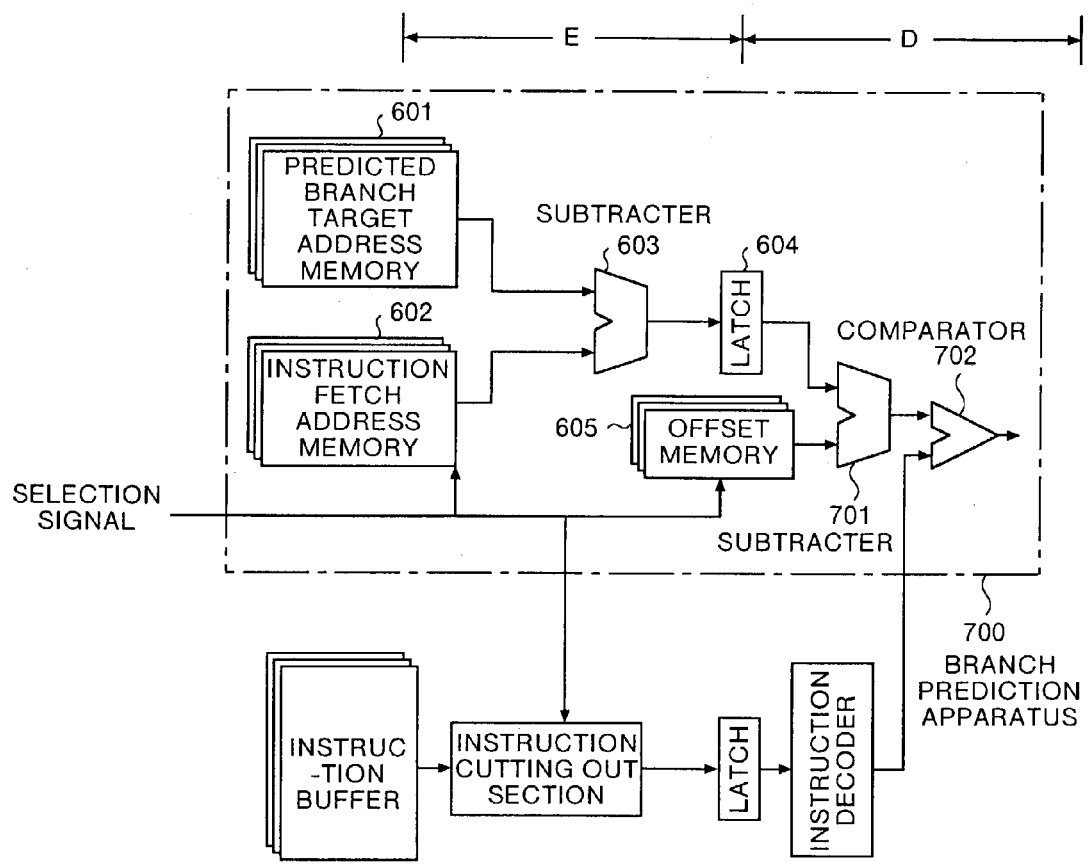
FIG. 7 is a functional block diagram showing the configuration of a variation example of the branch prediction apparatus according to the second embodiment.

FIG. 7 is a functional block diagram showing the configuration of a variation of the branch prediction apparatus according to the second embodiment. Here, for the convenience of explanation, the same reference numerals are assigned to functional sections that perform the same role as the respective sections shown in FIG. 6, and the detailed explanation thereof is omitted.

As shown in FIG. 7, a branch prediction apparatus 700 has the predicted branch target address memory 601, the instruction fetch address memory 602, the subtracter 603, the latch 604, the offset memory 605, a subtracter 701, and a comparator 702, as the functional sections that operate on the E stage and the D stage.

The subtracter 701 is a processor that performs subtraction between two input values and outputs the result. Here, the subtracter 701 is used for calculating a predicted displacement by subtracting the instruction fetch address from the predicted branch target address by the subtracter 603 to obtain a value and further subtracting an offset from the obtained value.

The comparator 702 is a processor that compares the two input values and outputs information as to whether these tow values agree with each other. Here, the comparator 702 is used for judging whether the predicted branch target address agrees with the actual branch target address, by comparing the predicted displacement output by the subtracter 701 with the actual displacement output by the instruction decoder.

In this manner, the branch prediction apparatus 700 uses the predicted branch target address, the offset, and the instruction fetch address, to calculate the predicted displacement in parallel with decoding of the instruction. When actual displacement is obtained by decoding the branch instruction, the actual displacement is immediately compared with the predicted displacement. As a result, even in the CISC type CPUs, the decoding of the branch instruction and the judgment whether the target address is correct or not can be carried out at a high speed on one cycle stage in the pipeline.

As explained above, according to the present invention, the predicted relative address is generated from the predicted branch target address and the reference address, and the generated predicted relative address is compared with the actual relative address of the branch instruction, to thereby perform a judgment. As a result, judgment whether the predicted branch target address is correct or not can be performed at a high speed, and thus advantageously preventing performance deterioration due to the judgment.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is;

1. A branch prediction apparatus predicting a branch target address of a branch instruction, the branch prediction apparatus comprising;
   a predicted relative address generation unit generating a predicted displacement as a predicted relative address from a predicted branch target address and a reference address, during a pre-decode stage of an instruction pipeline of a branch instruction; and
   a prediction judgment unit comparing the generated predicted displacement with an actual displacement and judging based upon the comparing whether the predicted branch target address agrees with the actual branch target address, during a decode stage of the instruction pipeline of the branch instruction for calculating the actual displacement for generating an actual target address of the branch instruction,
   wherein the predicted relative address generation unit generates the predicted displacement by subtracting a branch instruction address from the predicted branch target address, and wherein the actual displacement is obtained by decoding the branch instruction.

2. The branch prediction apparatus according to claim 1, wherein the predicted relative address generation unit includes:
   a branch target prediction unit that receives an instruction fetch address to generate the predicted branch target address of the branch instruction;
   an offset generation unit that generates an offset by subtracting the instruction fetch address from the branch instruction address; and
   a predicted displacement calculation unit that calculates the predicted displacement by subtracting the offset and the instruction fetch address from the predicted branch target address generated by the branch target prediction unit.

3. The branch prediction apparatus according to claim 2, wherein the predicted displacement calculation unit includes:
   a unit that calculates the branch instruction address by adding the offset to the instruction fetch address; and
   a unit that calculates the predicted displacement by subtracting the calculated branch instruction address from the predicted branch target address generated by the branch target prediction unit.

4. The branch prediction apparatus according to claim 2, further comprising:
   a plural branch instruction address information storage unit that stores instruction fetch addresses, offsets, and predicted branch target addresses for branch instructions, of an instruction train set in a plurality of instruction buffers in any order; and
   a branch instruction address information selection unit that selects an instruction fetch address, an offset, and a predicted branch target address for a specific branch instruction, from the plural branch instruction address information storage unit, wherein the predicted displacement calculation unit includes a unit that calculates the predicted displacement by using the instruction fetch address, the offset, and the predicted branch target address selected by the branch instruction address information selection unit.

5. The branch prediction apparatus according to claim 1, wherein the predicted relative address generation unit uses a branch history for referring to the predicted displacement by an instruction fetch address.

6. The branch prediction apparatus according to claim 1, wherein the predicted relative address generation unit includes:
   an offset-added predicted displacement calculation unit that generates an offset-added predicted displacement obtained by subtracting an instruction fetch address from the predicted branch target address as the predicted displacement, and
   wherein the actual branch target address is an offset-added displacement obtained by adding an offset obtained by subtracting an instruction fetch address from a branch instruction address, to the actual displacement obtained by decoding the branch instruction.

7. The branch prediction apparatus according to claim 6, wherein the predicted relative address generation unit includes:
   a branch target prediction unit that receives the instruction fetch address to generate the predicted branch target address of the branch instruction; and
   an offset-added predicted displacement calculation unit that calculates an offset-added predicted displacement by subtracting the instruction fetch address from the predicted branch target address generated by the branch target prediction unit.

8. The branch prediction apparatus according to claim 7, further comprising:
   a plural branch instruction address information storage unit that stores instruction fetch addresses, offsets, and predicted branch target addresses for branch instructions, of an instruction train set in a plurality of instruction buffers in any order; and
   a branch instruction address information selection unit that selects an instruction fetch address, an offset, and a predicted branch target address for a specific branch instruction, from the plural branch instruction address information storage unit,
   wherein the offset-added predicted displacement calculation unit includes a unit that calculates the offset-added predicted displacement by using the instruction fetch address and the predicted branch target address selected by the branch instruction address information selection unit, and
   wherein the actual branch target address is an offset-added displacement obtained by adding the offset selected by the branch instruction address information selection unit, to the actual displacement obtained by decoding the branch instruction.

9. The branch prediction apparatus according to claim 6, wherein the predicted relative address generation unit uses a branch history for referring to the offset-added predicted displacement by the instruction fetch address.

10. A method of predicting a branch target address of a branch instruction, comprising:
    generating a predicted displacement as a predicted relative address from a predicted branch target address and a reference address, during a pre-decode stage of an instruction pipeline of a branch instruction; and
    comparing the generated predicted displacement with an actual displacement and judging based upon the comparing whether the predicted branch target address agrees with the actual branch target address, during a decode stage of the instruction pipeline of the branch instruction for calculating the actual displacement for generating an actual target address of the branch instruction,
    wherein the generating the predicted displacement includes subtracting an address of the branch instruction from the predicted branch target address, and wherein the actual displacement is obtained by decoding the branch instruction.

11. The branch prediction method according to claim 10, wherein the generating the predicted displacement includes:
  generating the predicted branch target address of the branch instruction by receiving an instruction fetch address;
  generating an offset by subtracting the instruction fetch address from the branch instruction address; and
  calculating the predicted displacement by subtracting the offset and the instruction fetch address from the generated predicted branch target address.

12. The branch prediction method according to claim 11, wherein the calculating the predicted displacement includes:
  calculating the branch instruction address by adding the offset to the instruction fetch address; and
  calculating the predicted displacement by subtracting the calculated branch instruction address from the generated predicted branch target address.

13. The branch prediction method according to claim 11, further comprising:
  selecting an instruction fetch address, an offset, and a predicted branch target address for a specific branch instruction, from instruction fetch addresses, offsets, and predicted branch target addresses for branch instructions, of an instruction train set in a plurality of instruction buffers in any order,
  wherein the calculating the predicted displacement includes calculating the predicted displacement by using the selected instruction fetch address, offset, and predicted branch target address.

14. The branch prediction method according to claim 10, wherein the generating the predicted displacement includes referring to the predicted displacement by an instruction fetch address, using a branch history.

15. The branch prediction method according to claim 10, wherein the generating the predicted displacement includes generating an offset-added predicted displacement by subtracting an instruction fetch address from the predicted branch target address as the predicted displacement, and
  wherein the actual branch target address is an offset-added displacement obtained by adding the offset obtained by subtracting an instruction fetch address from a branch instruction address, to the actual displacement obtained by decoding the branch instruction.

16. The branch prediction method according to claim 15, wherein the generating the predicted displacement includes:
  generating the predicted branch target address of the branch instruction by receiving the instruction fetch address; and
  calculating an offset-added predicted displacement by subtracting the instruction fetch address from the generated predicted branch target address.

17. The branch prediction method according to claim 16, further comprising:
  selecting an instruction fetch address, an offset, and a predicted branch target address for a specific branch instruction, from instruction fetch addresses, offsets, and predicted branch target addresses for branch instructions, of an instruction train set in a plurality of instruction buffers in any order,
  wherein the calculating the offset-added predicted displacement includes calculating the offset-added predicted displacement by using the selected instruction fetch address and predicted branch target address, and
  wherein the actual branch target address is an offset-added displacement obtained by adding the selected offset to the actual displacement obtained by decoding the branch instruction.

18. The branch prediction method according to claim 15, wherein the generating the predicted displacement includes referring to the offset-added predicted displacement by the instruction fetch address, using a branch history.

* * * * *

UNITED STATES PATENT AND TRADEMARK OFFICE
CERTIFICATE OF CORRECTION

PATENT NO.       : 7,447,881 B2
APPLICATION NO.  : 10/338663
DATED            : November 4, 2008
INVENTOR(S)      : Masaki Ukai It is certified that error appears in the above-identified patent and that said Letters Patent is hereby corrected as shown below:

Column 9, Line 4, change "comprising;" to --comprising:--.

Signed and Sealed this

Twenty-sixth Day of May, 2009

JOHN DOLL
*Acting Director of the United States Patent and Trademark Office*